United States Patent
Miyano et al.

(10) Patent No.: US 7,890,271 B2
(45) Date of Patent: Feb. 15, 2011

(54) REVOLUTION INDICATOR AND A PROGRAM FOR THE REVOLUTION INDICATOR

(75) Inventors: Tomio Miyano, Kanagawa (JP); Hideaki Hori, Kanagawa (JP)

(73) Assignee: Ono Sokki Co., Ltd., Kanagawa (JP)

( * ) Notice: Subject to any disclaimer, the term of this patent is extended or adjusted under 35 U.S.C. 154(b) by 121 days.

(21) Appl. No.: 11/982,602

(22) Filed: Nov. 2, 2007

(65) Prior Publication Data
US 2008/0106256 A1    May 8, 2008

(30) Foreign Application Priority Data
Nov. 7, 2006   (JP)   ............... 2006-302037

(51) Int. Cl.
*G01B 7/04* (2006.01)
(52) U.S. Cl. ............... 702/33; 702/54; 702/182; 702/183
(58) Field of Classification Search .......... 702/33, 702/56, 85, 148, 180, 184, 185; 73/660; 318/490; 324/177
See application file for complete search history.

(56) References Cited

U.S. PATENT DOCUMENTS

| | | | | |
|---|---|---|---|---|
| 5,424,636 A | * | 6/1995 | Rollwage et al. ............. | 324/177 |
| 5,895,857 A | * | 4/1999 | Robinson et al. ............. | 73/660 |
| 6,801,873 B1 | * | 10/2004 | Jin et al. ..................... | 702/147 |
| 7,099,782 B2 | * | 8/2006 | Hitchcock et al. ............ | 702/56 |
| 7,143,011 B2 | * | 11/2006 | Yoshie et al. ............... | 702/188 |

FOREIGN PATENT DOCUMENTS

JP    H02-21266    1/1990

* cited by examiner

*Primary Examiner*—Hal D Wachsman
*Assistant Examiner*—Felix E Suarez
(74) *Attorney, Agent, or Firm*—Scully, Scott, Murphy & Presser, P.C.

(57) ABSTRACT

The object of the invention is providing a revolution indicator and a program for the indicator, which can detect a varying number of revolutions precisely. The indicator includes: a detecting portion detecting a physical phenomenon resulting from the revolution movement of a measuring object; a FFT computation portion performing a fast Fourier transform of the data detected by the detecting portion under a specific data length, and computing and outputting the analytical data; and a revolution computing portion computing the number of revolutions of the measuring object based on the analytical data output from the FFT computation portion. A variation determination portion is equipped, which makes the FFT computation portion compute the first analytical data continuously, based on the data successively detected by the detecting portion under the first data length and determines whether there is any variation or not in the first analytical data computed continuously.

8 Claims, 6 Drawing Sheets

REVOLUTION INDICATOR AND A PROGRAM FOR THE REVOLUTION INDICATOR

The disclosure of the following priority application is herein incorporated by reference: Japanese Patent Application No. 2006-302037, filed on Nov. 7, 2006.

BACKGROUND OF THE INVENTION

1. Field of the Invention

The present invention relates to a revolution indicator and a program for a revolution indicator which measures the number of revolutions of a measuring object performing a revolving movement.

2. Related Art

The number of revolutions (revolution speed) of a measuring object performing the revolving movement is measured by mounting such a revolution indicator as rotary encoder and the like.

However, since such a revolution indicator must be directly mounted to the measuring object, there have been problems; in which a jig must sometimes be fabricated for mounting the revolution indicator, and the effect(s) of the mounted revolution indicator end up changing the revolving movement properties of the measuring object, thus making it sometimes impossible to measure precisely the number of revolutions of the measuring object.

Hence, revolution indicators which can measure the number of revolutions of the measuring object without any adverse effects have been introduced and provided in open markets (for an example, refer to Japanese Unexamined Patent Application Publication No. H02-21266).

This invention detects the magnetic leakage flux of a revolving motor which is the object of measurement, finds the spectrum (analytical data) of the leakage flux by the fast Fourier transform (FFT) and finds the number of revolutions by determining the frequency showing the maximum value of the spectrum to be the revolution frequency of the revolving motor.

However, since revolution indicators such as these compute analytical data by FFT at a specific number of sampling points, one problem has been that the response of the analytical data to the variation of the number of revolutions is low, causing the lowering of the reliability of the analytical data.

In regard to this, counter-measures have been considered, such as reducing the number of sampling points and the like. However, the resolution of the frequency becomes coarse, which sometimes lowers the reliability of the computed analytical data.

For example, when the FFT computation is performed at 1024 sampling points within the measuring range of 500 Hz, a data length of 0.8 seconds is necessary, and the frequency resolution of the spectrum becomes 1.25 Hz.

On the other hand, when the FFT computation is performed at 256 sampling points within the same range (500 Hz), a data length of 0.2 seconds is necessary, and the frequency resolution of the spectrum becomes 5 Hz.

When both of these are compared there are not many sampling points, it is easy to respond to variations in the number of revolutions, since the data length of the data can be managed within a short amount of time. However, due to the lowering of the frequency resolution, the accuracy of the analytical data becomes coarse.

On the Contrary, when there are several sampling points, the accuracy of the analytical data is enhanced, since the frequency resolution is more detailed. However, since the data length of the data is lengthened, it is hard to respond to variations in the number of revolutions, which sometimes makes it difficult to determine the maximum value of the spectrum, and sometimes even lowers the measuring accuracy of the number of revolutions when varying.

SUMMARY OF THE INVENTION

This invention is intended to provide a revolution indicator and a program for the revolution indicator, which can detect a varying number of revolutions precisely with superior response.

This invention solves the above described problems by the following means for solving the problems.

A first aspect of the present invention includes: a detecting portion which detects a physical phenomenon resulting from the revolving movement of a measuring object; a FFT computation portion which performs a fast Fourier transform of the data detected by the detecting portion under a specific data length, and computes and outputs the analytical data; and a revolution computing portion which computes the number of revolutions of the measuring object based on the analytical data output from the FFT computation portion, wherein a variation determination portion is equipped, which makes the FFT computation portion compute the first analytical data continuously based on the data successively detected by the detecting portion under the first data length and determines whether there is any variation or not in the first analytical data computed continuously, and when there is a variation in the first analytical data computed continuously, the variation determination portion makes the FFT computation portion output the first analytical data computed under the first data length to the revolution computing portion, and when there is no variation in the first analytical data continuously computed, it makes the FFT computation portion compute the second analytical data under the second data length which is longer than the first data length and output to the revolution computing portion, wherein the first analytical data is spectrum data, and the variation of the first analytical data determined by the variation determination portion may be the variation of the frequency showing a maximum value of the spectrum data, the first analytical data may be fast-Fourier-transformed with a lower number of the sampling points than that of the second analytical data which is computed in the same frequency range, and the first analytical data may be computed so that the data detected under the second data length is computed by the zero-suppress processing which leaves only a specific range of the data making the others zero to perform the fast Fourier transform.

A second aspect of the present invention is a program to make the revolution indicator execute the following steps, including: a detecting step to detect a physical phenomenon resulted from the revolving movement of a measuring object; a FFT computation step in which the detected data in the detecting step is fast-Fourier-transformed under a specific data length, and the analytical data is computed and output; and a revolution computing step to compute the number of the revolutions of the measuring object based on the analytical data output in the FFT computation step, wherein the program makes the FFT computation step compute the first analytical data continuously under the first data length based on the data successively detected in the detecting step, and makes it execute a variation determination step to determine whether there is a variation or not in the continuously computed first analytical data, and when there is a variation in the first analytical data computed continuously, the variation determination step makes the FFT computation step output the first analytical data computed under the first data length to the revolution computing step, and when there is no variation in the first analytical data computed continuously, it makes the FFT computation step compute the second analytical data under the second data length, which is longer than the first data length and output to the revolution computing step.

According to the present invention, the revolution indicator computes continuously the first analytical data under the first data length and determines whether there is a variation or not in the computed first analytical data, respectively, and when there is a variation in the number of revolutions is computed based on the first analytical data, respectively, and when there is no variation, the second analytical data is computed under the second data length which is longer than the first data length, and since the number of revolutions is computed based thereon, for the data in which there is a variation in the number of revolutions of the measuring object, the number of revolutions responding to the variation can be computed with superior response, and for the data in which there is no variation, the number of revolutions is computed with improved measuring accuracy based on greater detail in the frequency resolution.

DETAILED DESCRIPTION OF THE INVENTION

The First Embodiment

Preferred embodiment(s) of the present invention shall be explained below with reference to the drawings. Moreover, in each drawing, the same constituents shall be designated by the same reference numerals, and when appropriate explanations thereof shall be omitted.

Figure 1:
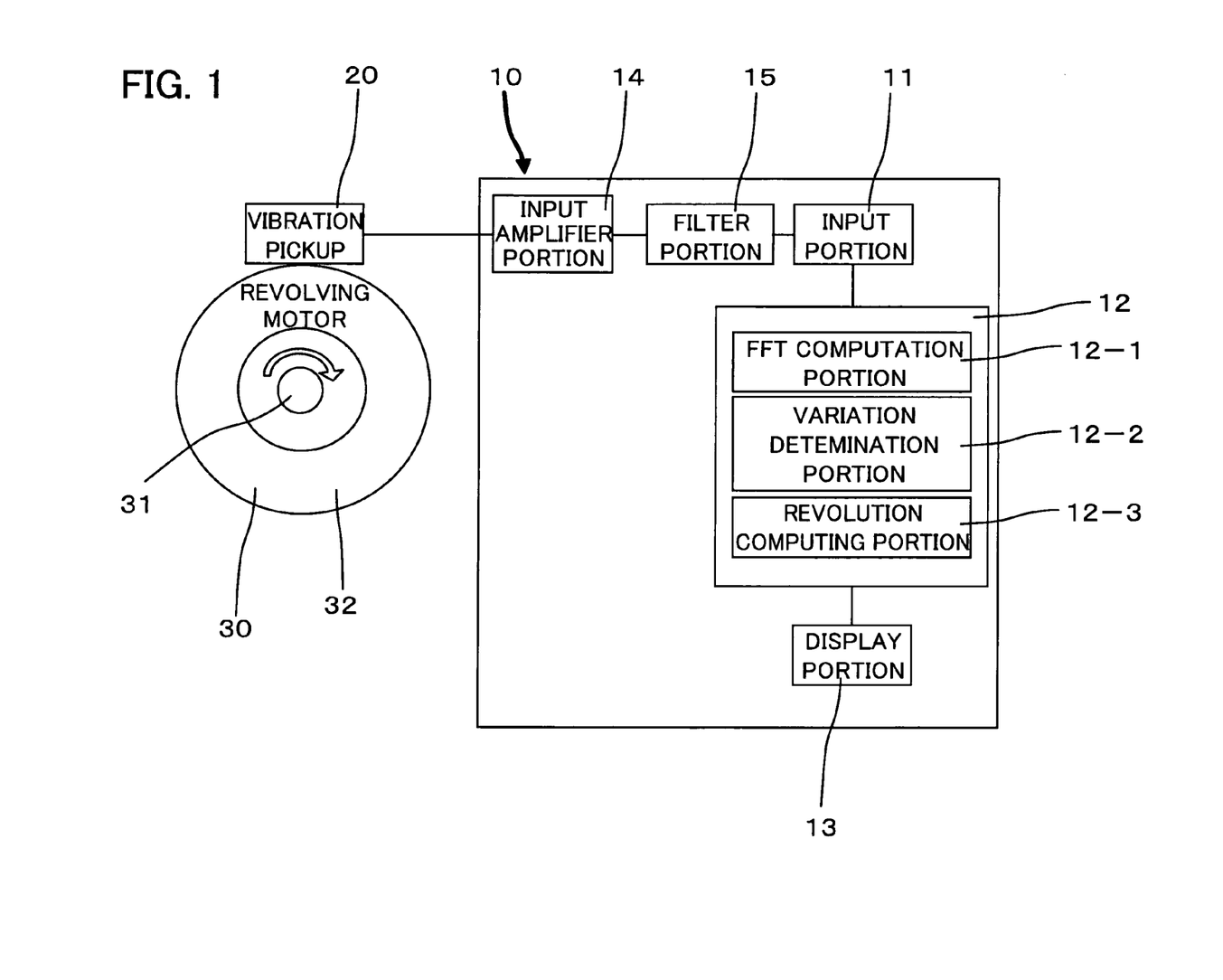
FIG. 1 is a drawing showing the first embodiment of the revolution indicator of the present invention.

The revolution indicator 10 is a measuring instrument computing the number of revolutions (revolution speed) of a revolving motor 30 based on the vibration data (data) detected by the vibration pickup 20, having an input portion 11, a computation control portion 12, an indicating portion 13, an input amplifier portion 14, and a filter portion 15.

The input portion 11 is an A/D converter which inputs successively time-series vibration data detected by the vibration pickup 20 to the computation control portion 12.

In this embodiment, the vibration data input analogously from the vibration pickup 20 is made discrete by the sampling time (time resolution) of 0.00078125 seconds (1/(500×2.56)) and is input to the computation control portion 12.

The computation control portion 12 is a control circuit to carry out the overall control of the each portion of the revolution indicator 10, having a FFT computation portion 12-1, a variation determination portion 12-2, and a revolution computing portion 12-3.

The FFT computation portion 12-1 is a computation circuit which fast-Fourier-transforms (FFT) the vibration data made discrete input successively from the input portion 11, and computes the vibration spectrum.

Figure 2A:
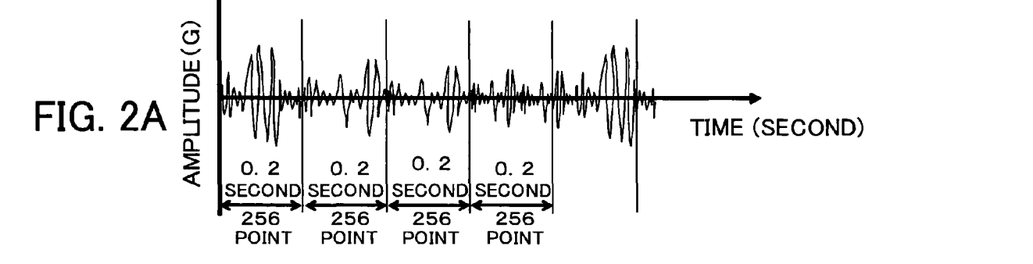
FIG. 2A is a drawing showing an example of the time waveform and the vibration spectrum processed by the revolution indicator.
Figure 2B:
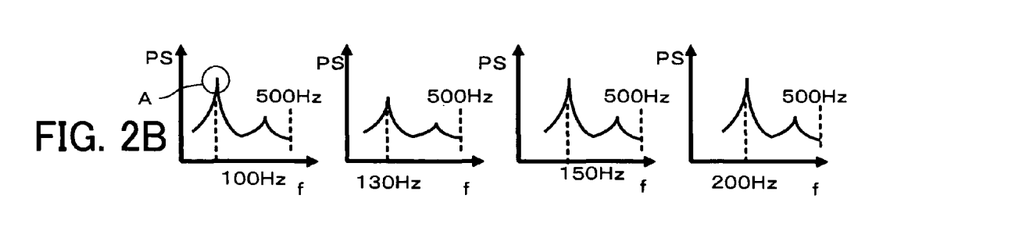
FIG. 2B is a drawing showing an example of the time waveform and the vibration spectrum processed by the revolution indicator.
Figure 2C:
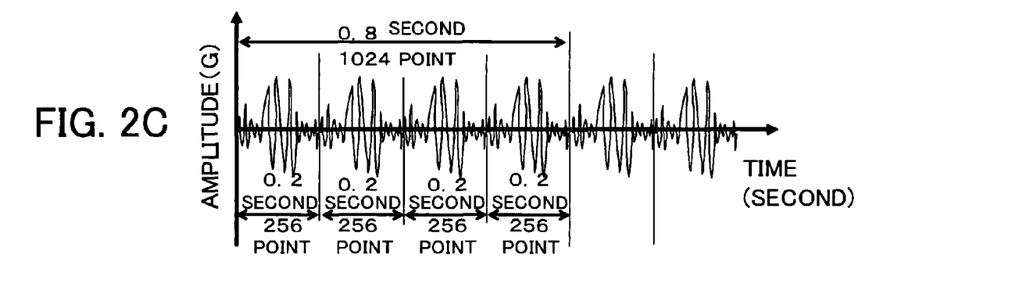
FIG. 2C is a drawing showing an example of the time waveform and the vibration spectrum processed by the revolution indicator.
Figure 2D:
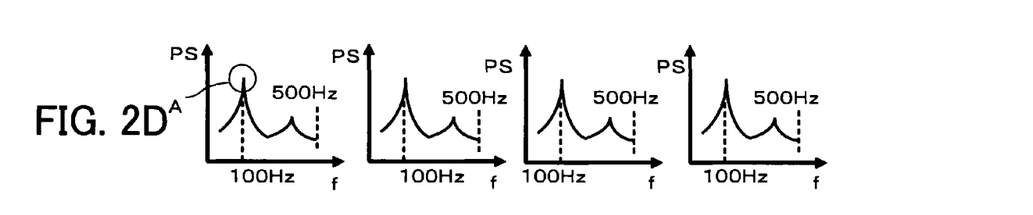
FIG. 2D is a drawing showing an example of the time waveform and the vibration spectrum processed by the revolution indicator.

In this embodiment, as shown in FIG. 2A and FIG. 2C, the vibration data made discrete at the sampling time of 0.00078125 seconds is continuously fast-Fourier-transformed at 256 sampling points (0.2 seconds: the first data length), to compute, as shown in FIG. 2B and FIG. 2D, the vibration spectrum (the first analytical data) whose frequency range is 500 Hz and the frequency resolution is 5 Hz.

Here, the data length (0.2 seconds) is calculated by the product of the number of sampling points (256 points) and the sampling time (0.00078125 seconds).

Additionally, in the time waveform shown in FIG. 2A and FIG. 2C, the axis of abscissas is made to be time t (second), the axis of ordinate to be acceleration amplitude (G), and in the vibration spectrum shown in FIG. 2B and FIG. 2C, the axis of abscissas is made to be frequency f (Hz), the axis of ordinate to be power spectrum (PS).

In addition, by the determination of the later described variation determination portion 12-2, when the longer vibration data is fast-Fourier-transformed, as shown in FIG. 2C, four of the 256 points of vibration data continuously computed are fast-Fourier-transformed in a lump at 1024 sampling points (0.8 second: the second data length)

Figure 2E:
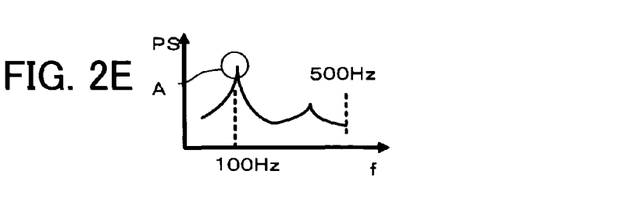
FIG. 2E is a drawing showing an example of the time waveform and the vibration spectrum processed by the revolution indicator.

The vibration spectrum (the second analytical data) computed by this transform is, as shown in FIG. 2E, 500 Hz in its frequency range, and 1.25 Hz in its frequency resolution, finer in frequency resolution than the vibration spectrum computed at the above described 256 sampling points, however, longer in data length.

Here, in the vibration spectrum shown in FIG. 2E, which is the same as in FIG. 2B and FIG. 2D, the axis of abscissas is made to be frequency f (Hz), and the axis of ordinate to be power spectrum (PS).

Additionally, in this embodiment, since the FFT computation portion 12-1 computes the vibration accompanying the revolution of the revolving motor 30 so as to make it be the vibration spectrum, the frequency (the A portion in FIG. 2B, FIG. 2D, FIG. 2E) showing the maximum value of the computed vibration spectrum can be determined to be the primary mode of the revolving movement of the revolving motor 30.

Accordingly, the frequency showing the maximum value of the primary mode becomes the number of revolutions of the revolving motor 30.

The variation determination portion 12-2 is a circuit to determine whether there is a variation or not in the frequency of the maximum value of the each vibration spectrum continuously computed by the FFT computation portion 12-1.

In this embodiment, when a variation larger than a predetermined value appears between the each frequency showing the maximum value of the four vibration spectrums continuously computed, it determines that "there is a variation in the frequency", and when within the predetermined value, it determines that "there is no variation in the frequency".

When it determines that "there is a variation in the frequency", since it shows that the revolution of the revolving motor 30 is varying, the variation determination portion 12-2 makes the FFT computation portion 12-1 output sequentially the vibration spectrum computed continuously at the 256 sampling points, as shown in FIG. 2B, to the revolution computing portion 12-3.

Contrary, when it determines that "there is no variation in the frequency", since it shows that the revolution of the revolving motor 30 is not varying, it makes the FFT computation portion 12-1 fast-Fourier-transform in a lump of four of the 256 points of vibration data, which are the object of the determination of the frequency variation at the 1024 sampling points as shown in FIG. 2E, and output its results to the revolution computing portion 12-3.

Figure 3A:
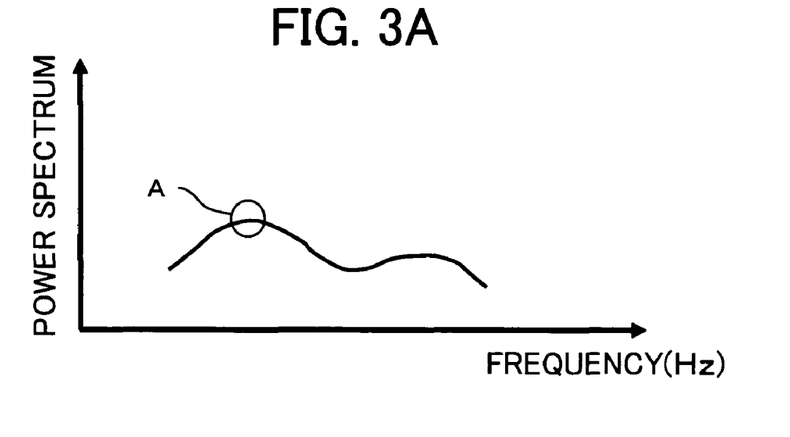
FIG. 3A is a drawing showing the comparison of the vibration spectrum dependent on the difference in the number of sampling points.

If, when the revolution of the revolving motor 30 is varying, the vibration data clipped by the data length of 0.8 seconds (the 1024 sampling points) is fast-Fourier-transformed, and the vibration spectrum as shown in FIG. 3A can be obtained.

Figure 3B:
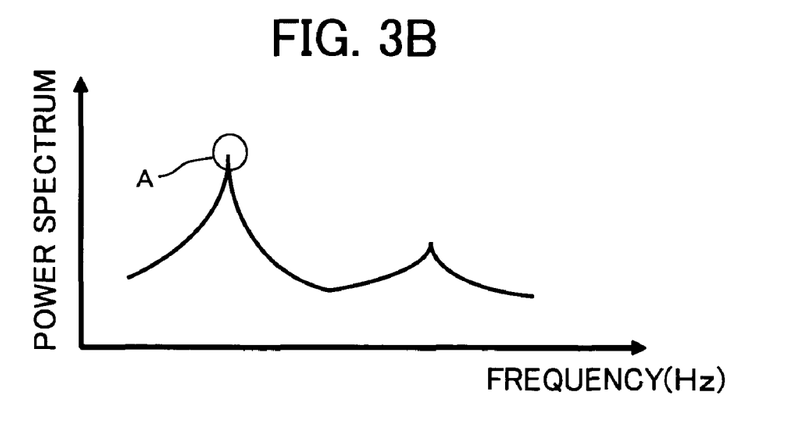
FIG. 3B is a drawing showing the comparison of the vibration spectrum dependent on the difference in the number of sampling points.

In contrast to this, when the vibration data clipped by the data length of 0.2 seconds (the 256 sampling points) is computed, and the vibration spectrum as shown in FIG. 3B can be obtained.

As described above, depending on the variation in the number of revolutions of the revolving motor 30, the frequency showing the maximum value of the vibration spectrum varies, the vibration spectrum shown in FIG. 3A ends in that the maximum value varying within the data length of 0.8 seconds is averaged, resulting in a smaller value than the maximum value of the spectrum clipped by 0.2 seconds.

Figure 3C:
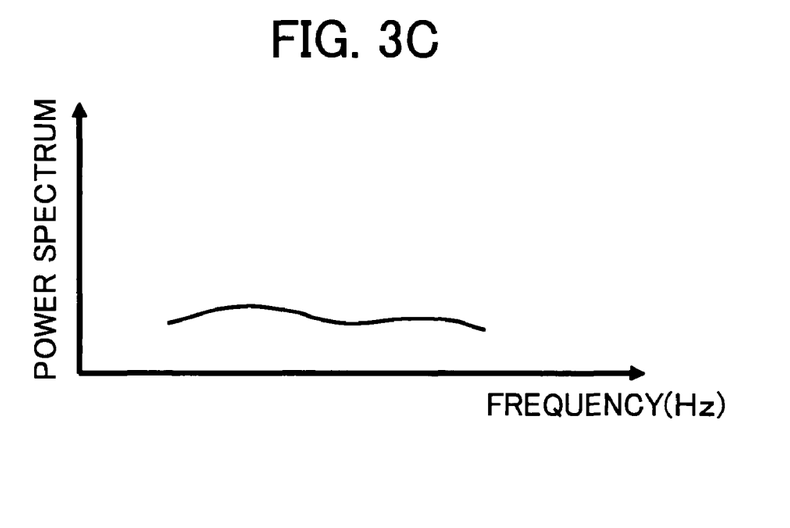
FIG. 3C is a drawing showing the comparison of the vibration spectrum dependent on the difference in the number of sampling points.

Particularly, when the variation per unit time is large, the vibration spectrum clipped by the data length of 0.8 seconds becomes a more flat wave shape as shown in FIG. 3C, making it difficult to detect the maximum value.

Hence, when the number of revolutions is varying, the variation determination portion 12-2 makes the FFT computation portion 12-1 compute so that the maximum value of the vibration spectrum can be clearly detected by reducing the number of sampling points of the vibration spectrum within a range not affecting the measuring accuracy.

The revolution computing portion 12-3 inputs the vibration spectrum output from the FFT computation portion 12-1, detects the frequency showing the maximum value, and computes the number of revolutions of the revolving motor 30 based on the detected frequency.

In this embodiment, the number of revolutions per second is measured as the frequency (Hz), and computed so as to be displayed by revolutions per minute (r/min).

The display portion 13 is a display which displays the number of revolutions of the revolving motor 30 computed by the revolution computing portion 12-3.

The input amplifier portion 14 is an amplifier to amplify the vibration data detected from the vibration pickup 20.

The filter portion 15 is an AAF (anti-aliasing filter) to remove the aliasing noise contained in the vibration data amplified by the input amplifier portion 14.

The vibration pickup 20 is an accelerometer which detects the revolution-vibration of the revolving motor 30 as acceleration, and is fixed to the later described a stator 32 of the revolving motor 30 and measures the revolution-vibration of a rotor 31.

The revolving motor 30 is an electromagnetic motor formed by the rotor 31 and the stator 32.

Next, the motion of the revolution indicator 10 detecting the number of revolutions of the revolving motor 30 is described.

Figure 4:
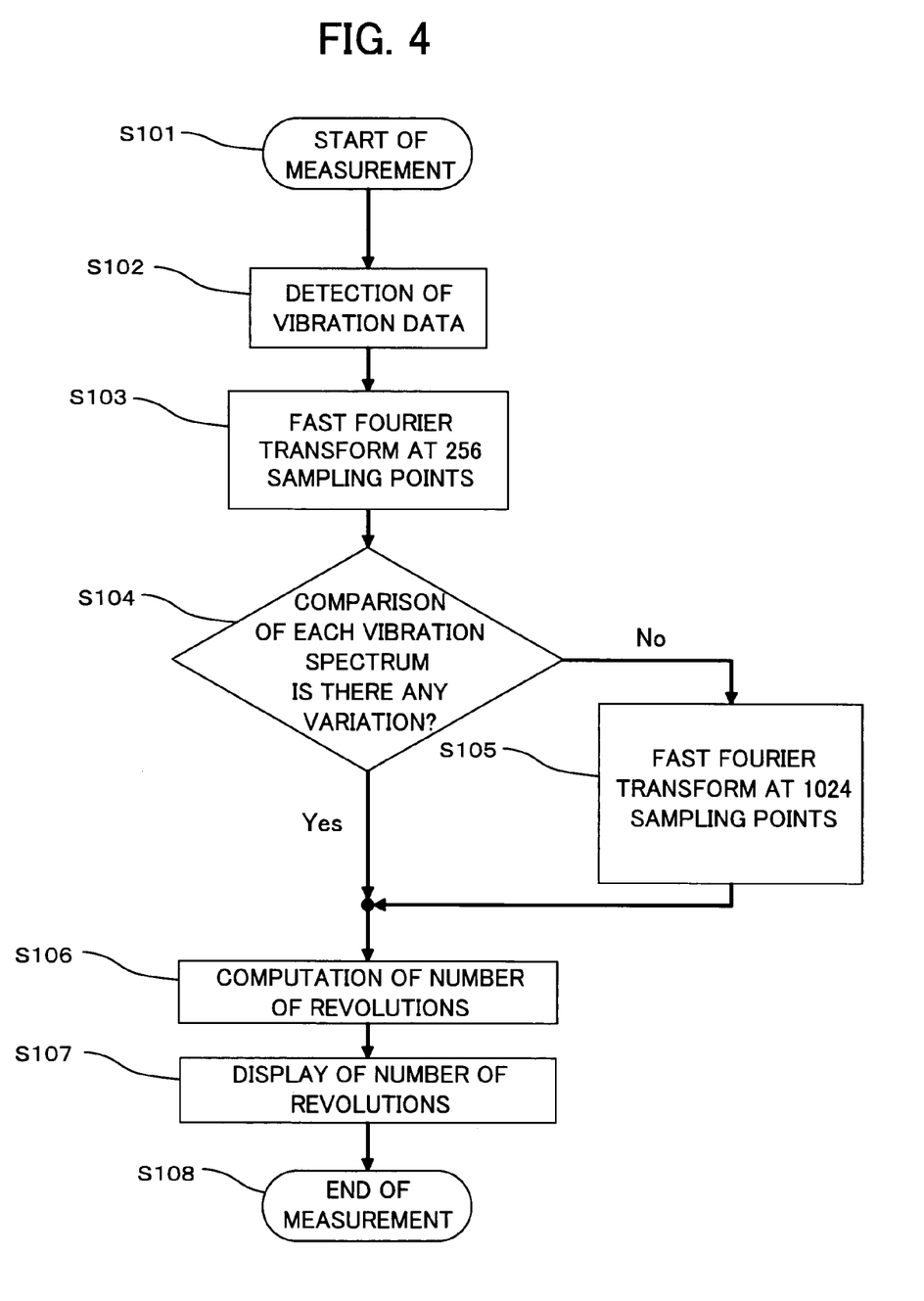
FIG. 4 is the operation flow of the revolution indicator detecting the number of revolutions of the revolving motor.

When the vibration pickup 20 is properly arranged to the stator 32 of the revolving motor 30 by the person doing the measuring, the rotor of the revolving motor 30 is revolved to start the measurement of the number of revolutions as shown in FIG. 4 (S101).

After the start of the revolution of the revolving motor 30, the revolution indicator 10 makes the vibration pickup 20 detect the vibration of the revolving motor 30 (S102), and inputs the detected vibration data successively to the computation control portion 12 through the input amplifier 14, the filter portion 15, and the input portion 11.

The computation control portion 12 divides the input vibration data, as shown in FIG. 2A, by the every one of 256 sampling points to perform the fast Fourier transform continuously and computes the vibration spectrum (S103).

Then, the computation control portion 12 determines whether there is a variation or not in the frequency showing the maximum value of the vibration spectrum computed at the 256 sampling points, by comparing the four continuously computed vibration spectrums (S104).

When there is a variation (S104: YES) as the result of the comparison, as shown in FIG. 2B, the computed vibration spectrums are sequentially output to the revolution computing portion 12-3.

As shown in FIG. 2D, when there is no variation as the result of the comparison (S104: No), the vibration spectrums of the 256 sampling points at which the four vibration spectrums used for the comparison are computed are lumped together and, as shown in FIG. 2E, the vibration spectrum is computed at the 1024 sampling points (S105), and output to the revolution computing portion 12-3.

The revolution computing portion 12-3 detects the frequency showing the maximum value of the input vibration spectrum, and computes it so as to be the number of revolutions per minute (r/min) (S106), and displays it in the display portion 13 (S107).

When the measurement of the number of revolutions of the revolving motor 30 is completed, the measurement ends (S108).

As mentioned above, revolution indicator of the first embodiment provides the following advantages:

(1) The revolution indicator 10 continuously computes the vibration spectrum computed at the 256 sampling points (data length of 0.2 seconds), determines whether there is a variation or not in the frequency showing the maximum of the continuously computed four vibration spectrums; when there is a variation, computes the number of revolutions based on each vibration spectrum, and when there is no variation, computes the vibration spectrum computed at 1024 sampling points (data length of 0.8 seconds), and computes the number of revolutions based thereon. Consequently, when there is a variation in the number of revolutions of the revolving motor 30, it is possible to display the number of revolutions responding to the variation with superior response, and when there is no variation, it is possible to display the number of revolutions with enhanced accuracy by improving the frequency resolution;

(2) Since the vibration spectrum computed at 256 sampling points (data length of 0.2 sec) is fast-Fourier-transformed at fewer sampling points than that of the vibration spectrum computed in the same frequency range at 1024 sampling points, the vibration spectrum computed at 256 sampling points can be computed faster than the vibration spectrum computed at 1024 sampling points, enabling a response to the variation in the number of revolutions of the revolving motor 30.

Additionally, when the determination of the variation of the vibration spectrum computed at 256 sampling points is determined by the frequency showing the maximum of the spectrum data, it is possible to keep the maximum value of the spectrum data in its high state, thereby allowing easy discrimination of the maximum value; and (3) Since the determination of the variation of the vibration spectrum computed at 256 sampling points is determined by the frequency showing the maximum of each vibration spectrum, it is possible to keep the maximum value of the each vibration spectrum in its high state as shown in FIG. 3B, thereby allowing easy discrimination of the maximum value.

The Second Embodiment

Additionally, in the description of the second embodiment, by giving the same reference numerals or unified reference numerals to portions performing the similar functions to the first embodiment, redundant descriptions and drawings are properly omitted.

Figure 5:
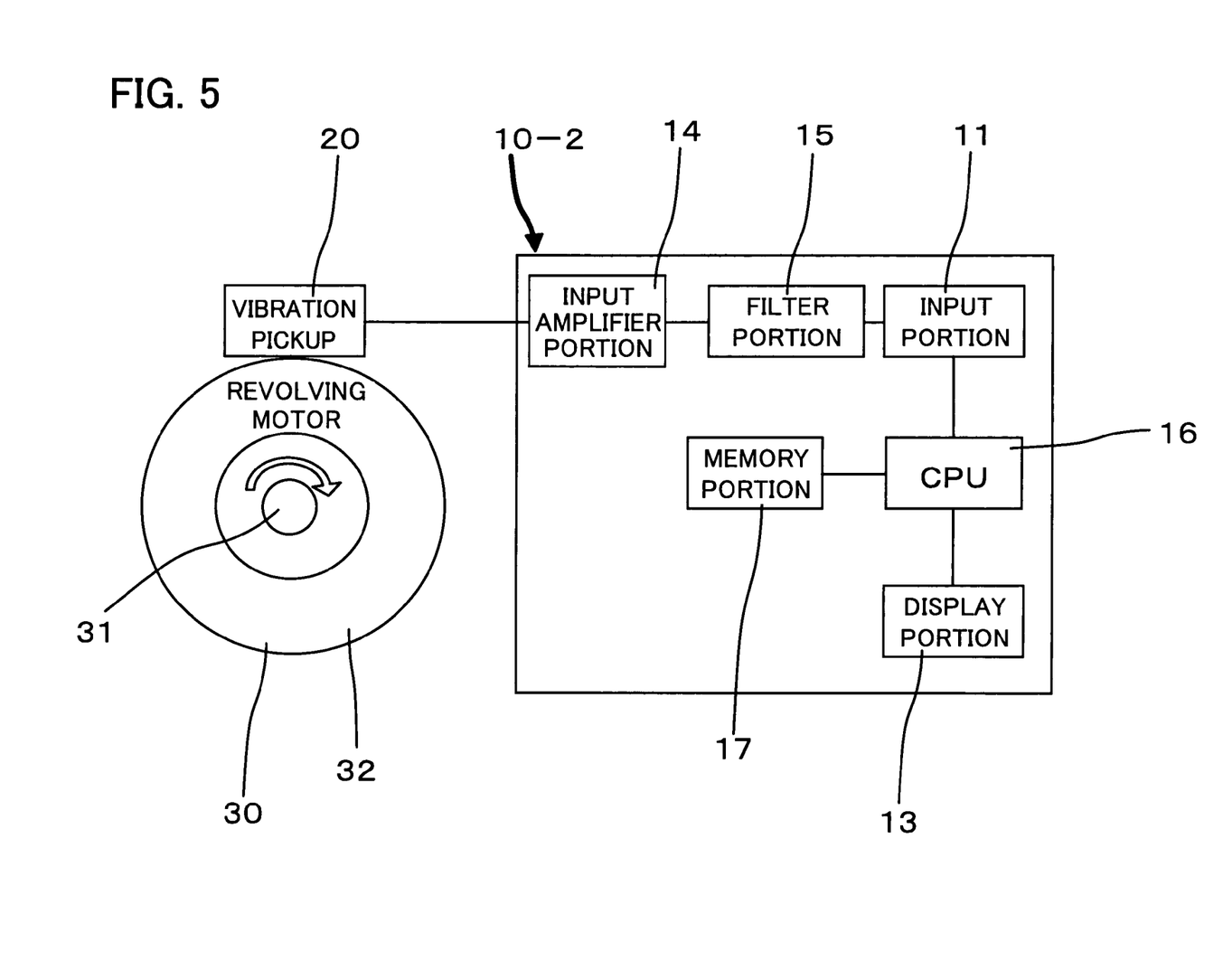
FIG. 5 is a drawing showing the second embodiment of the revolution indicator of the present invention.

The different between the revolution indicator 10-2 of the second embodiment to the revolution indicator 10 of the first embodiment is, as shown in FIG. 5, that a CPU 16 and a memory portion 17 is provided in place of the computation control portion 12.

The computation function of the computation control portion 12 of the first embodiment is installed in the memory portion 17 as a revolution indicator program, which is activated by the CPU 16.

Moreover, in the first embodiment, the vibration data at the 256 sampling points is fast-Fourier-transformed to compute the vibration spectrum. However, in the second embodiment, the vibration data clipped at the 1024 sampling points is processed by the zero-suppress processing in which the fast Fourier transform is performed leaving only a specific range, and making the others zero.

Accordingly, a vibration spectrum which apparently has a finer resolution than the frequency resolution determined by the number of sampling points can be computed.

Figure 6A:
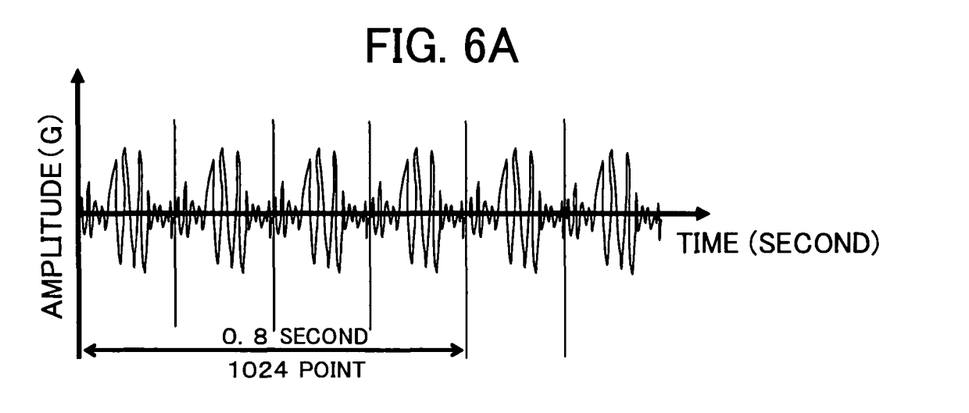
FIG. 6A is a drawing describing the zero-suppress processing.
Figure 6B:
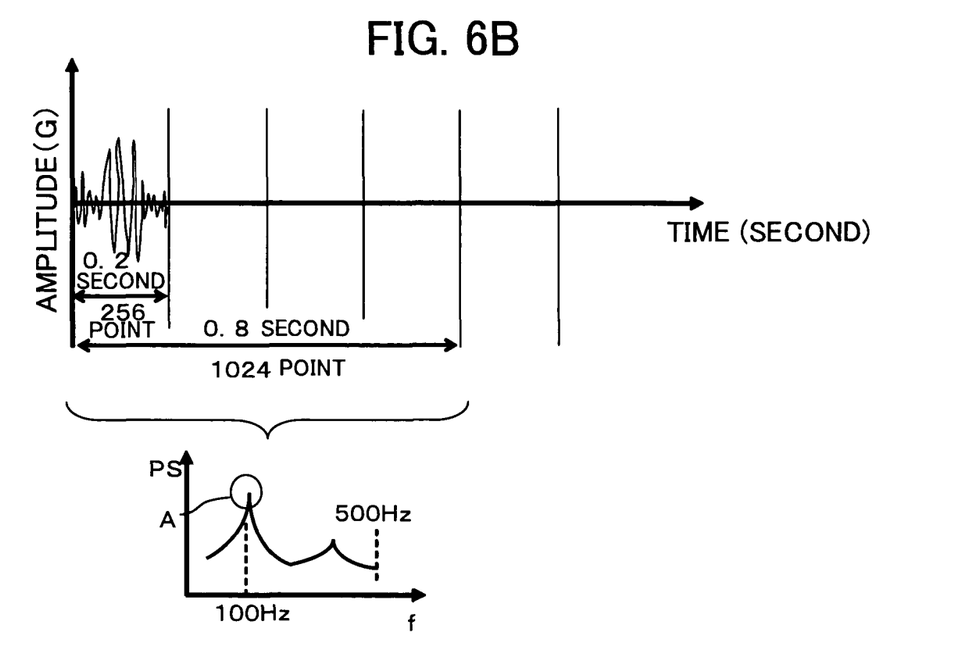
FIG. 6B is a drawing describing the zero-suppress processing.

To be more precise, vibration data having the specific cycle as shown in FIG. 6A is clipped at 1024 sampling points, and as shown in FIG. 6B, the vibration spectrum is computed so that the fast Fourier transform is performed leaving only the 256 sampling points which contains the vibration data for one cycle, and making the others zero.

In addition, the vibration data left in the zero suppress processing is not limited to the above described data for one cycle, and it can be changed to be for two cycles, or three cycles, etc. in accordance to the content of the measurements and to the purposes thereof, and the number of sampling points to be left also not only limited to the 256 sampling points, and can be increased or decreased in accordance to the length of the vibration data desired to be left.

As mentioned above, the revolution indicator of the second embodiment provides the following advantages:

(1) The vibration spectrum computed by the program for the revolution indicator is processed by the zero-suppress processing in which the cyclic vibration data detected by the data length of 0.8 seconds (1024 sampling points), as shown in FIG. 6B, is fast-Fourier-transformed, leaving only the 256 sampling points which contain the vibration data for one cycle, and making the others zero, Consequently, it is possible to make the actual data length of the vibration data 0.2 seconds, and to compute the vibration spectrum whose frequency resolution is 1.25 Hz.

Accordingly, in this embodiment, when there is a variation in the number of revolutions of the revolving motor 30, the vibration spectrum whose frequency resolution is 1.25 Hz can be computed. Therefore, it is possible to prevent lowering of the measuring accuracy, such that when the number of revolutions varies, the frequency resolution becomes 5 Hz as in the first embodiment, and at the same time, the data length of the vibration data can be shortened enabling improvement in the efficiency of computation processing; and (2) Since the revolution indicator 10-2 activates the program for revolution indicator installed in the memory portion 17 by the CPU 16, the revolution indicator 10-2 can be manufactured at low price without fabricating a special computing circuit, etc. as the computation control portion 12 of the first embodiment.

Modified Embodiment

Various modifications or changes are possible without being limited to the above described embodiments, and those inventions are within an equivalent range.

(1) In each embodiment, as a means to detect the number of revolutions, the vibration data measured by the vibration pickup 20 is used. However, other methods may be used.

For example, the use of data measured from light, magnetism, sound, etc. are also possible.

(2) In each embodiment, the revolution indicator 10 computes the vibration spectrum with the 256 sampling points and 1024 points. However, the number of sampling points may be set and the vibration spectrum may be computed in accordance to the measuring environments or measuring conditions thereof.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A revolution indicator, comprising:
   a detecting portion which detects data related to a physical phenomenon resulting from the revolving movement of a measuring object;
   a fast Fourier transformation computation portion which performs a fast Fourier transform of the data detected by the detecting portion under a first data length to compute first analytical data, and outputs the first analytical data; and
   a revolution computing portion which computes the number of revolutions of the measuring object; and
   a variation determination portion which is equipped to make the fast Fourier transformation computation portion compute a plurality of the first analytical data continuously based on the data successively detected by the detecting portion under the first data length and to determine whether there is variation or not among the plurality of the first analytical data computed continuously, wherein when there is the variation among the plurality of the first analytical data computed continuously, the variation determination portion makes the fast Fourier transformation computation portion sequentially output the plurality of the first analytical data to the revolution computing portion, and when there is no variation among the plurality of the first analytical data computed continuously, the variation determination portion makes the fast Fourier transformation computation portion compute second analytical data under a second data length which is longer than the first data length, and output the second analytical data to the revolution computing portion, and the revolution computing portion computes the number of revolutions of the object based on one of the plurality of first analytical data, and the second analytical data.

2. A revolution indicator according to claim 1, wherein the first analytical data is spectrum data, and wherein the variation of the first analytical data determined by the variation determination portion is the variation of frequency showing a maximum value of the spectrum data.

3. A revolution indicator according to claim 1, wherein the first analytical data is fast-Fourier-transformed with a lower number of sampling points than that of the second analytical data which is computed in the same frequency range.

4. A revolution indicator according to claim 2, wherein the first analytical data is fast-Fourier-transformed with a lower number of sampling points than that of the second analytical data which is computed in the same frequency range.

5. A revolution indicator according to claim 1, wherein the first analytical data is computed so that the data detected under the second data length is computed by the zero-suppress processing which leaves only a specific range of the data, making the others zero in order to perform the fast Fourier transform.

6. A revolution indicator according to claim 2, wherein the first analytical data is computed so that the data detected under the second data length is computed by the zero-suppress processing which leaves only a specific range of the data, making the others zero in order to perform the fast Fourier transform.

7. A non-transitory computer readable medium containing instructions stored therein for causing a computer processor to perform the following steps, including:

a detecting step, executed on a computer, to detect data related to a physical phenomenon resulting from the revolving movement of a measuring object;

a fast Fourier transformation computing step, executed on the computer, in which the detected data in the detecting step is fast-Fourier-transformed under a first data length and first analytical data is computed and output; and a revolution computing step, executed on the computer, to compute a number of the revolutions of the measuring object, wherein the program for revolution indicator includes the following steps:

a step to make the fast Fourier transformation computing step compute a plurality of the first analytical data continuously under the first data length based on the data successively detected in the detecting step, and to execute a variation determination step to determine whether there is a variation or not among the plurality of the continuously computed first analytical data, and when there is a variation among the plurality of the first analytical data continuously computed, the variation determination step makes the fast Fourier transformation computing step sequentially output the plurality of the first analytical data computed under the first data length to the revolution computing step, and when there is no variation in the first analytical data computed continuously, the variation determination step makes the fast Fourier transformation computing step compute second analytical data under a second data length which is longer than the first data length and output the second analytical data to the revolution computing step, and the revolution computing step computes the number of revolutions of the object based on one of the plurality of first analytical data, and the second analytical data.

8. A non-transitory computer-readable medium containing instructions stored therein for causing a computer processor to perform the steps comprising:

detecting data related to a physical phenomenon resulting from the revolving movement of an object;

performing a fast Fourier transform (FFT) of the detected data related to the detected physical phenomenon under a first data length;

computing a plurality of first analytical data based upon the FFT data;

determining whether there is variation among the plurality of first analytical data;

outputting the plurality of first analytical data when it is determined that there is the variation among the plurality of first analytical data;

computing a second analytical data under a second data length which is longer than the first data length, when there is no variation among the plurality of first analytical data and outputting the second analytical data; and computing a number of revolutions of the object based on one of the plurality of first analytical data and the second analytical data.

* * * * *